US007326855B2

(12) United States Patent
Moffatt

(10) Patent No.: US 7,326,855 B2
(45) Date of Patent: Feb. 5, 2008

(54) DEVICE FOR STACKING WIRES OR CABLES

(75) Inventor: Wilbur Keith Moffatt, Freeport, IL (US)

(73) Assignee: Greenlee Textron Inc., Rockford, IL (US)

( * ) Notice: Subject to any disclaimer, the term of this patent is extended or adjusted under 35 U.S.C. 154(b) by 0 days.

(21) Appl. No.: 11/250,325

(22) Filed: Oct. 14, 2005

(65) Prior Publication Data

US 2006/0035525 A1 Feb. 16, 2006

Related U.S. Application Data

(63) Continuation-in-part of application No. 11/190,987, filed on Jul. 27, 2005, now abandoned.

(60) Provisional application No. 60/591,651, filed on Jul. 28, 2004.

(51) Int. Cl.
*H01B 17/00* (2006.01)

(52) U.S. Cl. .................. 174/154; 174/138 G; 248/68.1

(58) Field of Classification Search ................ 174/154, 174/138 G; 248/68.1
See application file for complete search history.

(56) References Cited

U.S. PATENT DOCUMENTS

| 1,356,040 A | 10/1920 | Caskey |
| 1,542,267 A | 6/1925 | Parker |
| 2,125,770 A | 8/1938 | Dabroski |
| 2,397,291 A * | 3/1946 | Archibald .................. 248/68.1 |
| 2,594,211 A * | 4/1952 | Poupitch .................... 248/68.1 |
| 2,723,815 A | 11/1955 | Browning |
| 2,990,150 A * | 6/1961 | Weigel et al. ............. 248/68.1 |
| 3,231,076 A | 1/1966 | Freiman |
| D207,057 S | 2/1967 | Palmer |
| D207,507 S | 4/1967 | Warner |
| 3,345,029 A | 10/1967 | Palmer |
| 3,430,903 A | 3/1969 | Mathes |
| 3,498,575 A | 3/1970 | Downing |
| 3,531,071 A | 9/1970 | Kubli |
| 3,626,553 A | 12/1971 | Darney et al. |
| 3,651,449 A | 3/1972 | Hall et al. |
| D246,826 S | 1/1978 | Ilukowicz |
| 4,114,241 A | 9/1978 | Bisping |
| 4,119,285 A | 10/1978 | Bisping et al. |

(Continued)

FOREIGN PATENT DOCUMENTS

CH 465 687 1/1969

(Continued)

*Primary Examiner*—Jinhee Lee
(74) *Attorney, Agent, or Firm*—Trexler, Bushnell, Giangiorgi, Blackstone & Marr, Ltd.

(57) ABSTRACT

A device for stacking wires or cables is provided. The device includes an attachment portion capable of attachment to a stud or other anchor, and a wire or cable receiving portion connected to the attachment portion. The wire or cable receiving portion has a plurality of segments which form a generally serpentine-shaped spine, thereby providing a plurality of wire or cable receiving slots. A pair of spaced apart tabs extend from each main portion. Each said tab has an end attached to the respective main portion and an opposite end which is free. Each tab curves outwardly and downwardly from the respective main portion and at least partially overlaps the respective wire or cable receiving slot.

36 Claims, 9 Drawing Sheets

U.S. PATENT DOCUMENTS

| | | | |
|---|---|---|---|
| 4,234,012 A | 11/1980 | Schupback |
| 4,306,697 A | 12/1981 | Mathews |
| 4,372,706 A | 2/1983 | Young |
| 4,509,710 A | 4/1985 | Cooper et al. |
| 4,655,423 A | 4/1987 | Schavilje et al. |
| 4,660,790 A | 4/1987 | Muz |
| D289,732 S | 5/1987 | Jason |
| 4,682,748 A | 7/1987 | Freudenmann et al. |
| 4,903,920 A | 2/1990 | Merritt |
| 4,905,942 A | 3/1990 | Moretti |
| 4,917,340 A | 4/1990 | Juemann et al. |
| 5,067,677 A | 11/1991 | Miceli |
| 5,090,645 A | 2/1992 | Zuercher |
| D326,999 S | 6/1992 | Johnson et al. |
| D328,023 S | 7/1992 | Allison |
| D328,024 S | 7/1992 | Grubicy et al. |
| D333,255 S | 2/1993 | Newcomer et al. |
| D333,256 S | 2/1993 | Newcomer et al. |
| D333,257 S | 2/1993 | Newcomer et al. |
| D334,134 S | 3/1993 | Newcomer et al. |
| 5,201,484 A | 4/1993 | Thoen |
| 5,209,441 A | 5/1993 | Satoh |
| D336,421 S | 6/1993 | Grubicy et al. |
| 5,316,246 A | 5/1994 | Scott et al. |
| 5,364,355 A | 11/1994 | Alden et al. |
| 5,375,726 A | 12/1994 | Lechleiter |
| D376,309 S | 12/1996 | Takai |
| 5,612,509 A | 3/1997 | Market |
| 5,626,316 A | 5/1997 | Smigel et al. |
| 5,655,673 A | 8/1997 | Weterrings et al. |
| D389,732 S | 1/1998 | Weishaar |
| 5,740,994 A | 4/1998 | Laughlin |
| 5,765,786 A | 6/1998 | Gretz |
| D402,396 S | 12/1998 | Protz, Jr. |
| D407,963 S | 4/1999 | Gretz et al. |
| 5,939,680 A | 8/1999 | Gretz et al. |
| 5,954,302 A | 9/1999 | Robertson et al. |
| 5,964,434 A | 10/1999 | Lynch, Jr. |
| 5,988,570 A | 11/1999 | Gretz |
| 5,992,802 A | 11/1999 | Campbell |
| D421,318 S | 2/2000 | O'Brien et al. |
| 6,161,804 A | 12/2000 | Paske et al. |
| 6,173,926 B1 | 1/2001 | Elvegaard |
| 6,206,330 B1 | 3/2001 | Oi et al. |
| D439,828 S | 4/2001 | Kiely et al. |
| 6,222,128 B1 | 4/2001 | Gretz |
| 6,227,502 B1 | 5/2001 | Derman |
| 6,250,591 B1 | 6/2001 | Cunningham |
| D447,931 S | 9/2001 | Aitken |
| 6,290,201 B1 | 9/2001 | Kanie et al. |
| 6,313,406 B1 | 11/2001 | Gretz |
| D453,103 S | 1/2002 | Tell |
| 6,354,543 B1 | 3/2002 | Paske |
| 6,355,887 B1 | 3/2002 | Gretz |
| 6,378,813 B1 | 4/2002 | Gretz |
| 6,382,571 B1 | 5/2002 | Gretz |
| 6,386,489 B1 | 5/2002 | Gretz |
| 6,434,314 B1 | 8/2002 | Gatica et al. |
| 6,450,459 B2 | 9/2002 | Nakanishi |
| 6,484,920 B1 | 11/2002 | Selcer |
| 6,513,766 B1 | 2/2003 | Gretz |
| 6,517,032 B1 | 2/2003 | Gretz |
| D471,787 S | 3/2003 | Gebrara |
| 6,561,466 B1 | 5/2003 | Myers et al. |
| 6,581,884 B1 | 6/2003 | Gretz |
| 6,591,054 B2 | 7/2003 | Afflerbaugh et al. |
| 6,600,866 B2 | 7/2003 | Gatica et al. |
| 2001/0023911 A1 | 9/2001 | Kommers |
| 2002/0146228 A1 | 10/2002 | Afflerbaugh et al. |
| 2002/0176682 A1 | 11/2002 | Gatica et al. |
| 2003/0015629 A1 | 1/2003 | Brell et al. |

FOREIGN PATENT DOCUMENTS

| | | |
|---|---|---|
| DE | 24 31 834 | 1/1976 |
| DE | 26 22 136 | 12/1977 |
| EP | 0 191 480 | 2/1986 |
| FR | 1 311 393 | 10/1961 |
| GB | 2 165 099 | 4/1986 |
| JP | 9189378 | 7/1997 |
| JP | 10191540 | 7/1998 |
| JP | 9103021 | 9/1999 |
| WO | WO 93/01439 | 1/1993 |
| WO | WO 97/37164 | 10/1997 |
| WO | WO 99/02909 | 1/1999 |
| WO | WO 01/71232 | 9/2001 |

* cited by examiner

DEVICE FOR STACKING WIRES OR CABLES

This application is a continuation-in-part of U.S. patent application Ser. No. 11/190,987, filed on Jul. 27, 2005 now abandoned. U.S. patent application Ser. No. 11/190,987 claims the domestic benefit of U.S. provisional application Ser. No. 60/591,651, filed on Jul. 28, 2004, which is herein incorporated by reference in its entirety.

BACKGROUND OF THE INVENTION

Cable stacking members are currently used in various applications to hold cables of different types to a multitude of structures. A relatively new application of such a cable stacking member is to attach such a cable stacking member using nails or staples to a wooden stud commonly used in stick frame construction, which is the most commonly used method for building houses and other structures in North America. After being fastened to a stud, then wires are inserted into the cable stacking member before drywall is put into place making access to the wires or cables difficult thereafter. Many times, the types of wires that are routed using this technique are power wires such as 12-2 NM or 14-3G RD. Alternatively, communication wires and coaxial wires could also be routed using this type of cable stacking member, although they are never routed with power wires at the same time because of interference and electrical hazards. Prior to these cable stacking members, wires or cables were mounted onto studs using staples. This technique greatly limited the number of wires or cables that could be mounted. The cable stacking member allow for more wires or cables to be mounted to the stud and still maintain the inch and a quarter distance from any power wire to the edge of a standard 2"×4" stud as required by the National Electric Code and the Canadian Electric Code.

U.S. Pat. No. 5,090,645 discloses a prior art cable stacking member which allows multiple cables to be held therein. When routing wires or cables throughout a building, metal conduit or nonmetallic insulated electrical wires or cables are run along the framing members of the building and secured with the cable stacking member. The framing members usually consist of wood or metal studs, joists and rafters which support the walls and ceiling of a building. Cable stacking members are generally placed every three to five feet along the cables to be secured.

The prior art cable stacking member disclosed in the '645 patent is formed of a fastener element supported on a base plate. The fastener element is a support member which has a plurality of elongate extensions extending therefrom. The extensions are arranged in equid-distantly spaced, approximately parallel relationship and are cantilever mounted to the support member so that elongate slots are formed between adjacent extensions. The cable stacking member is attached to a mounting surface and a plurality of electrical cables, wires, or other elongate articles can be retained within the slots. The ends of the elongate extensions have shoulders which narrow the open end of the slot between extensions to a width smaller than the thickness of the cable.

The cable stacking member of the '645 patent is molded of a plastic material that is sufficiently flexible to allow the extensions to spread apart and permit the cable to enter the slot, and then close around the cable, thereby securing it in the slot.

The cable stacking member disclosed in the '645 patent present several disadvantages. In the '645 patent, the extensions may be repeatedly spread apart which places stress on the upright support member. This can cause the support member to bow, thereby spreading the extensions apart from each other and possibly enabling the wires or cables to slip out between the extensions.

The width of all the slots in the cable stacking member disclosed in the '645 patent is the same, making the cable stacking member incapable of adequately holding wires or cables of different sizes and profiles. Frequently, the wires or cables are only loosely held making the possibility of the wires or cables falling out of the cable stacking member or sliding in a direction that is substantially parallel to their length quite likely, making installation difficult and increasing the possibility of wire or cable movement after the drywall has been installed. This would lead to a violation of the National Electric Code and the Canadian Electric Code and may create the electrical hazard associated therewith.

In addition, it can be difficult for a user to remove a cable from the cable stacking member disclosed in the '645 patent. It can be difficult for a user to spread the extensions away from each other because the user has to insert his or her finger between the two uppermost extensions to spread the extension apart. For a user with larger fingers, it can be difficult to grip the extension.

The present invention provides a device for stacking wires or cables which overcomes the problems presented in the prior art and which provides additional advantages over the prior art. Such advantages will become clear upon a reading of the attached specification in combination with a study of the drawings.

SUMMARY OF THE INVENTION

Briefly, the present invention discloses a device for stacking wires or cables. The device includes an attachment portion capable of attachment to a stud or other anchor, and a wire or cable receiving portion connected to the attachment portion. The wire or cable receiving portion has a plurality of segments which form a generally serpentine-shaped spine, thereby providing a plurality of wire or cable receiving slots. A pair of spaced apart tabs extend from each main portion. Each said tab has an end attached to the respective main portion and an opposite end which is free. Each tab curves outwardly and downwardly from the respective main portion and at least partially overlaps the respective wire or cable receiving slot.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which.

DETAILED DESCRIPTION OF THE ILLUSTRATED EMBODIMENT

Figure 1:
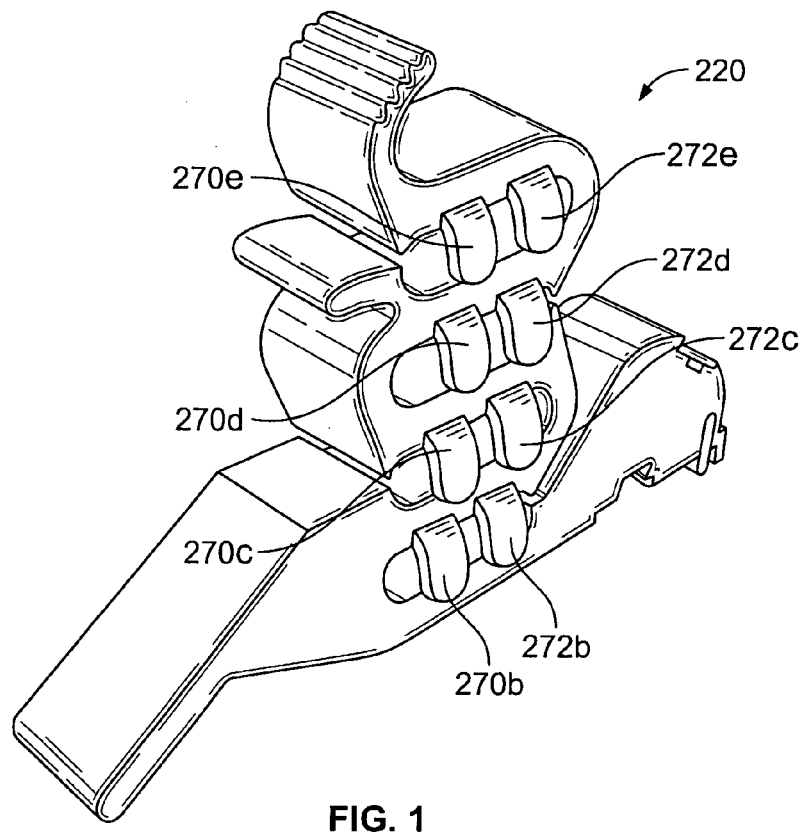
FIG. 1 is a perspective of the device which incorporates the features of a first embodiment of the present invention.

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.

The present invention provides a device 220, 320 for stacking wires or cables 14. The device 220, 320 is secured to a wooden stud 16, usually a 2"×4", in a wall or the like during construction of a building by a nail 18, for example a common six penny nail.

Figure 2:
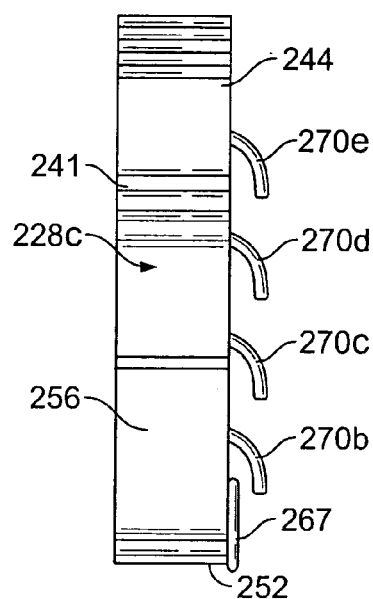
FIG. 2 is a left side elevational view of the device of FIG. 1.
Figure 3:
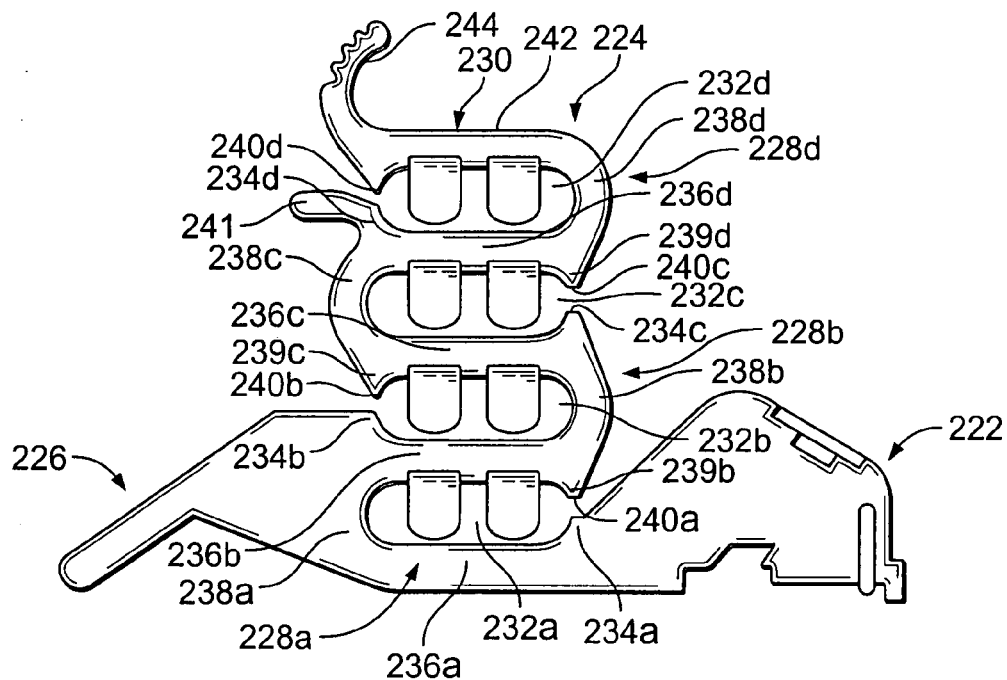
FIG. 3 is a front elevational view of the device of FIG. 1.
Figure 4:
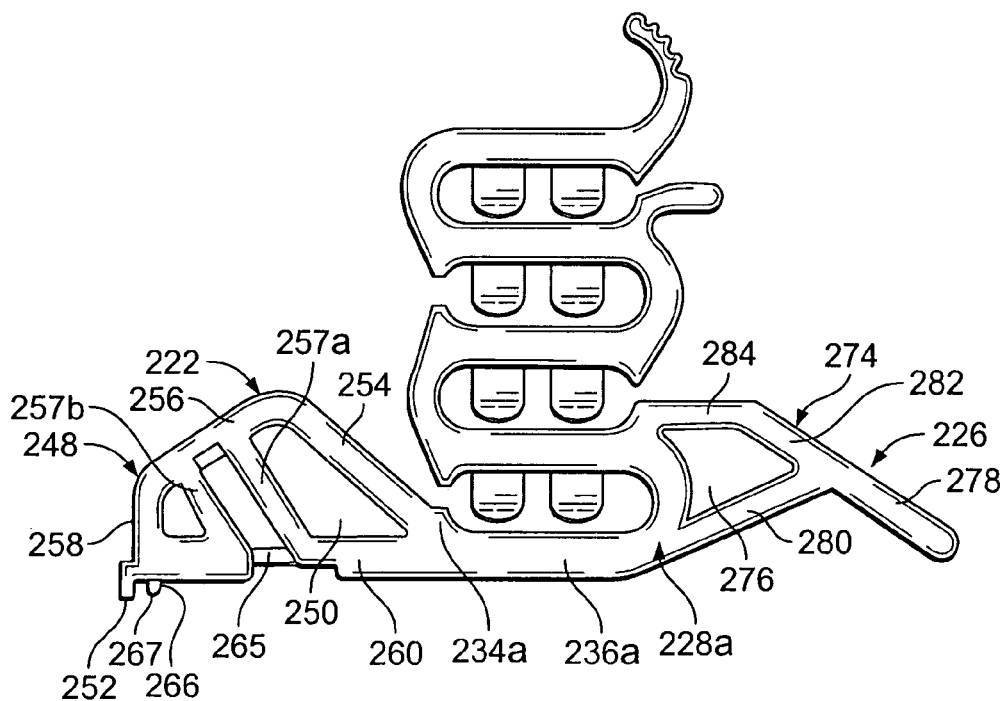
FIG. 4 is a rear elevational view of the device of FIG. 1.
Figure 5:
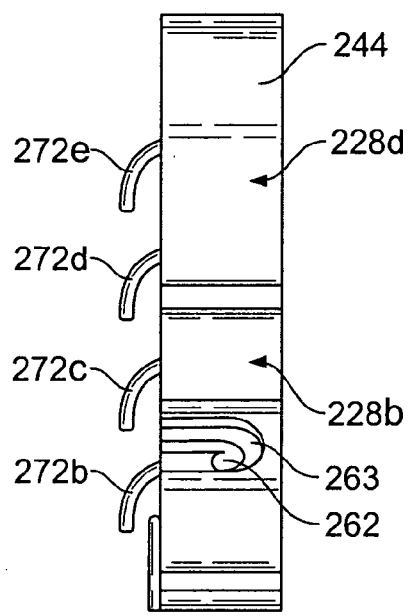
FIG. 5 is a right side elevational view of the device of FIG. 1.
Figure 6:
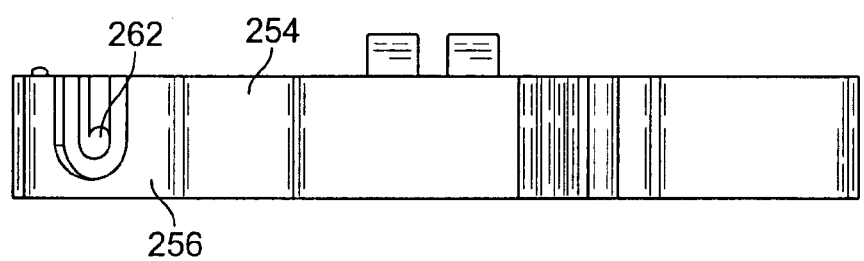
FIG. 6 is a top plan view of the device of FIG. 1.
Figure 7:
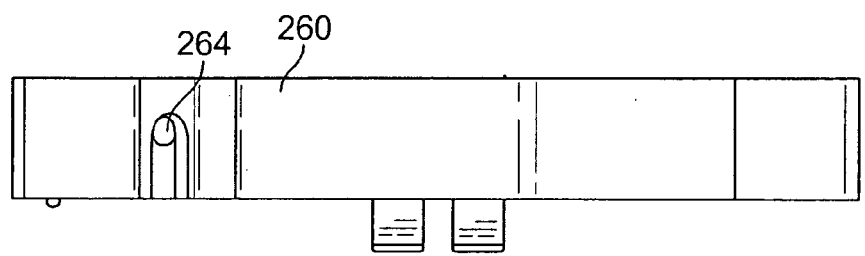
FIG. 7 is a bottom plan view of the device of FIG. 1.
Figure 8:
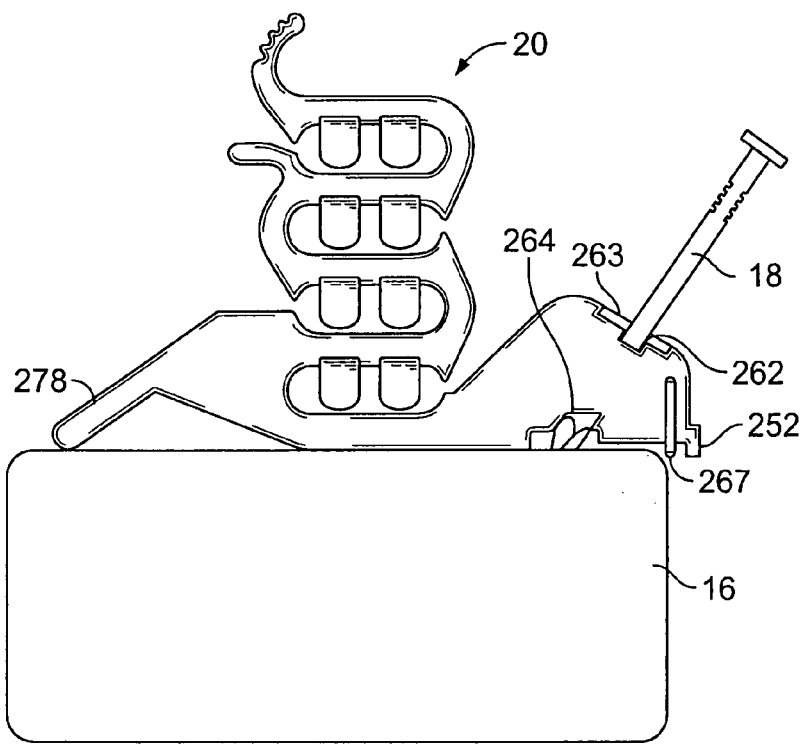
FIG. 8 is a front elevational view of the device of FIG. 1 shown being attached to a stud by a nail.
Figure 9:
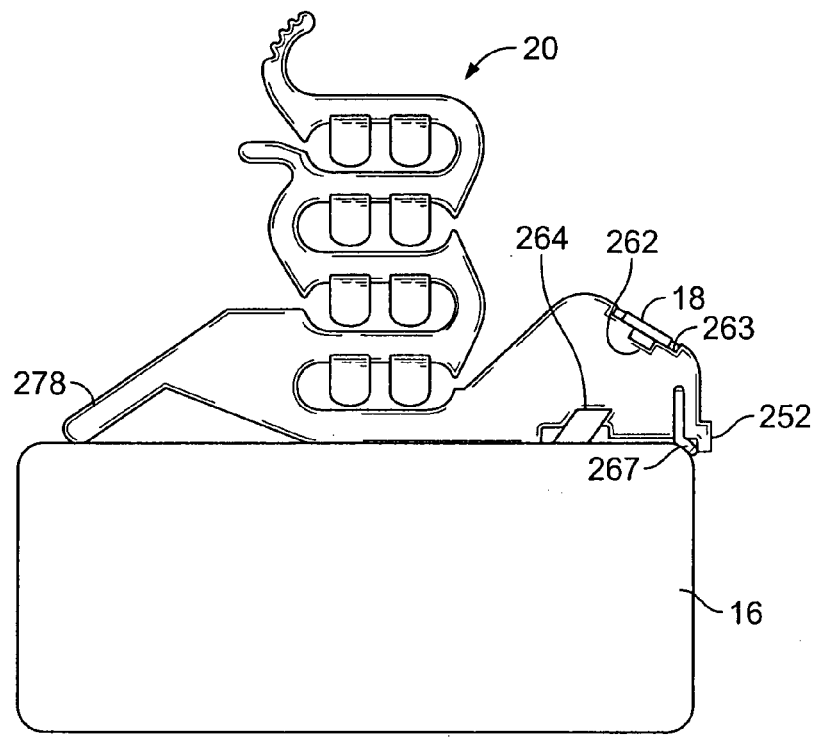
FIG. 9 is a front elevational view of the device of FIG. 1 shown attached to a stud by a nail.
Figure 10:
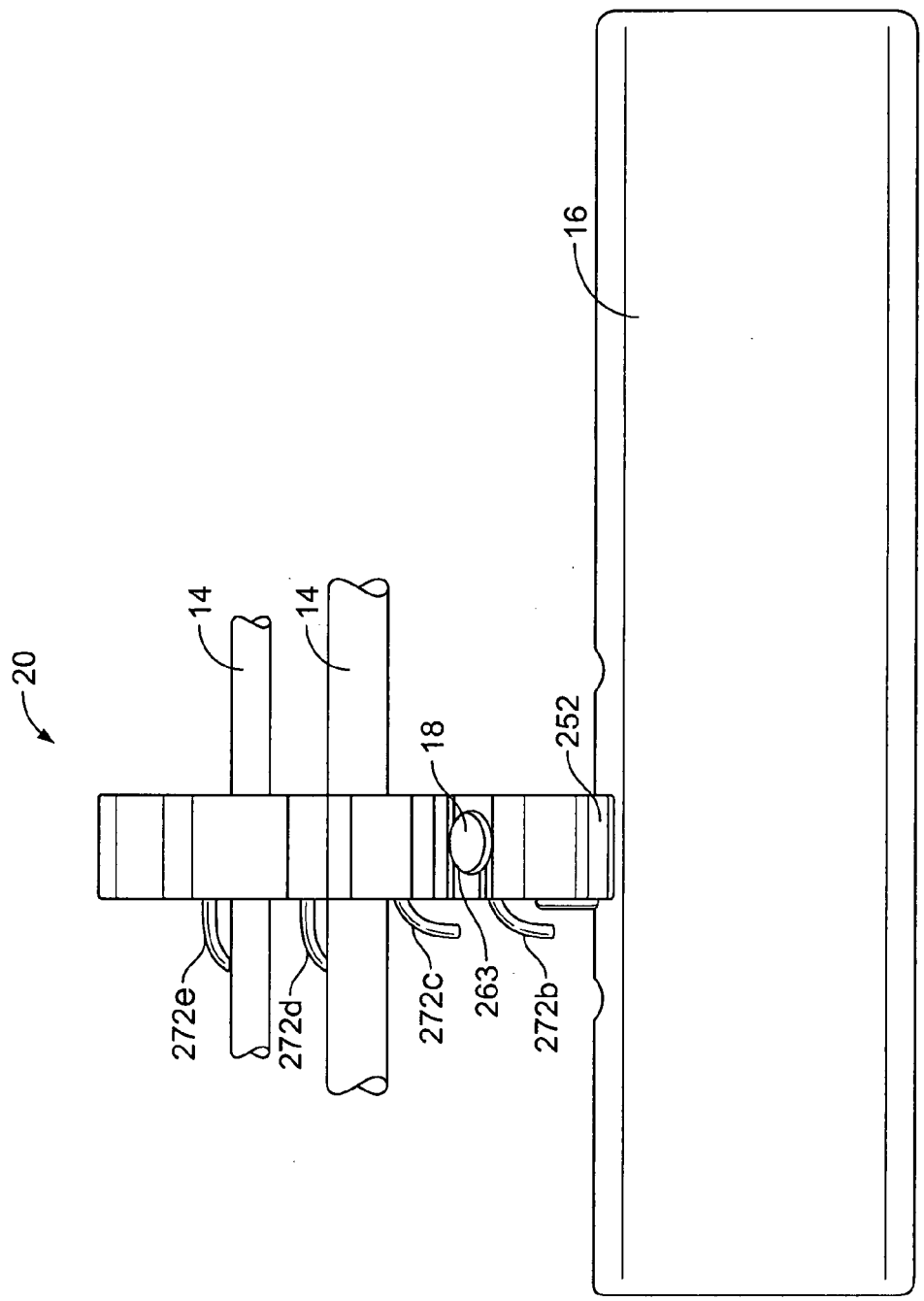
FIG. 10 is a right side elevational view of the device of FIG. 1 shown attached to a stud by a nail and having wire or cables inserted therein.
Figure 11:
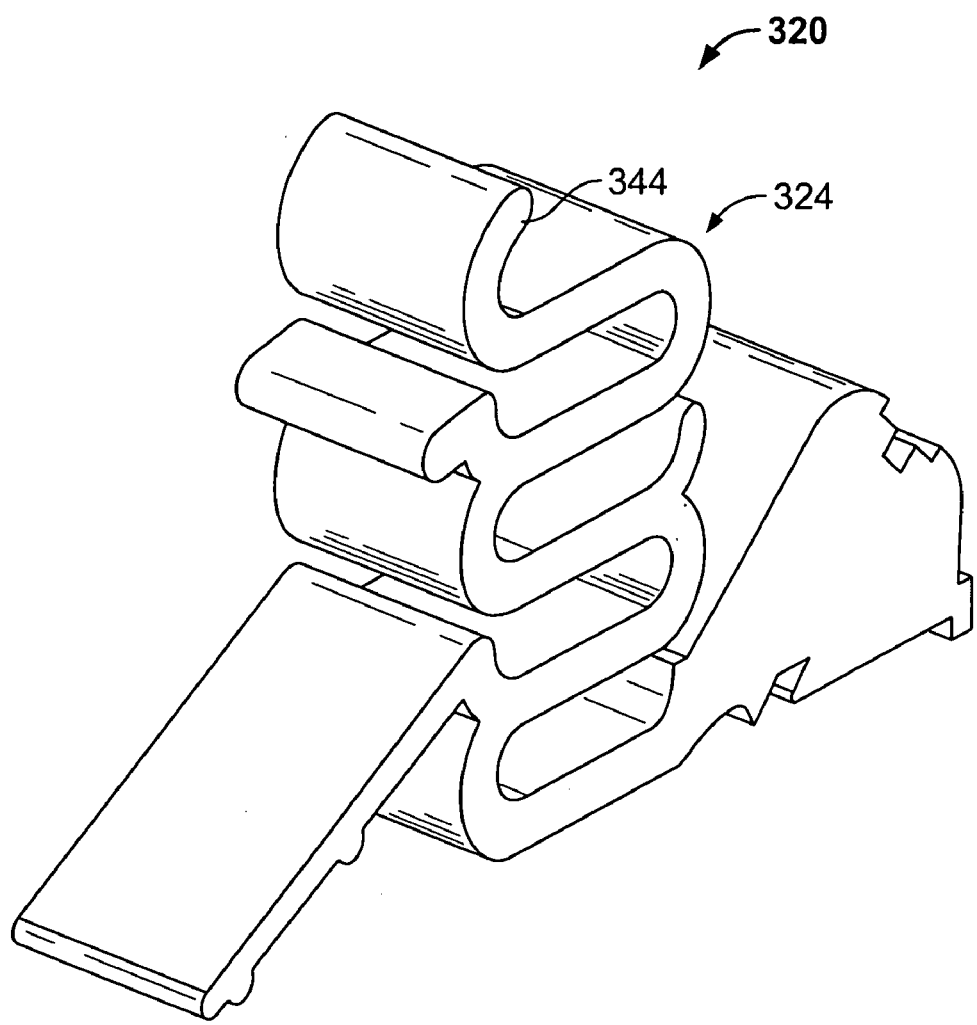
FIG. 11 is a perspective of the device which incorporates the features of a second embodiment of the present invention.
Figure 13:
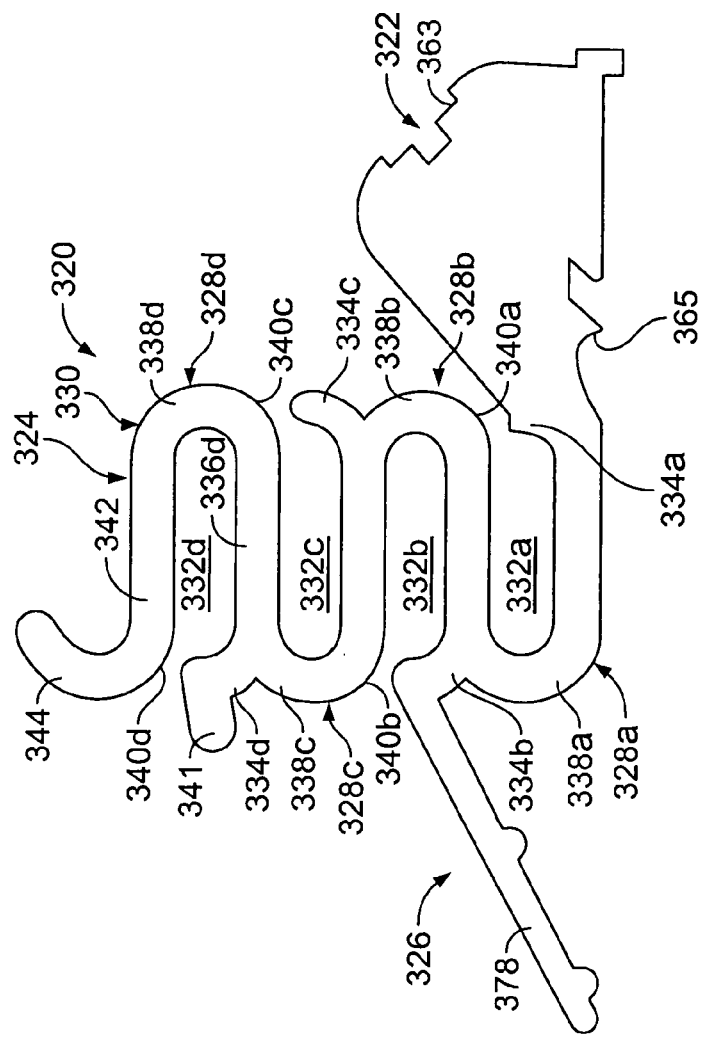
FIG. 13 is a front elevational view of the device of FIG. 11.
Figure 12:
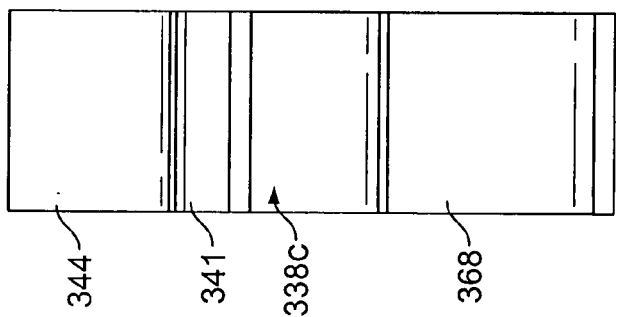
FIG. 12 is a left side elevational view of the device of FIG. 11.
Figure 15:
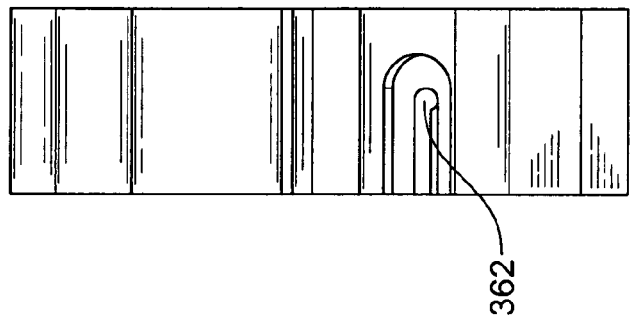
FIG. 15 is a right side elevational view of the device of FIG. 11.
Figure 14:
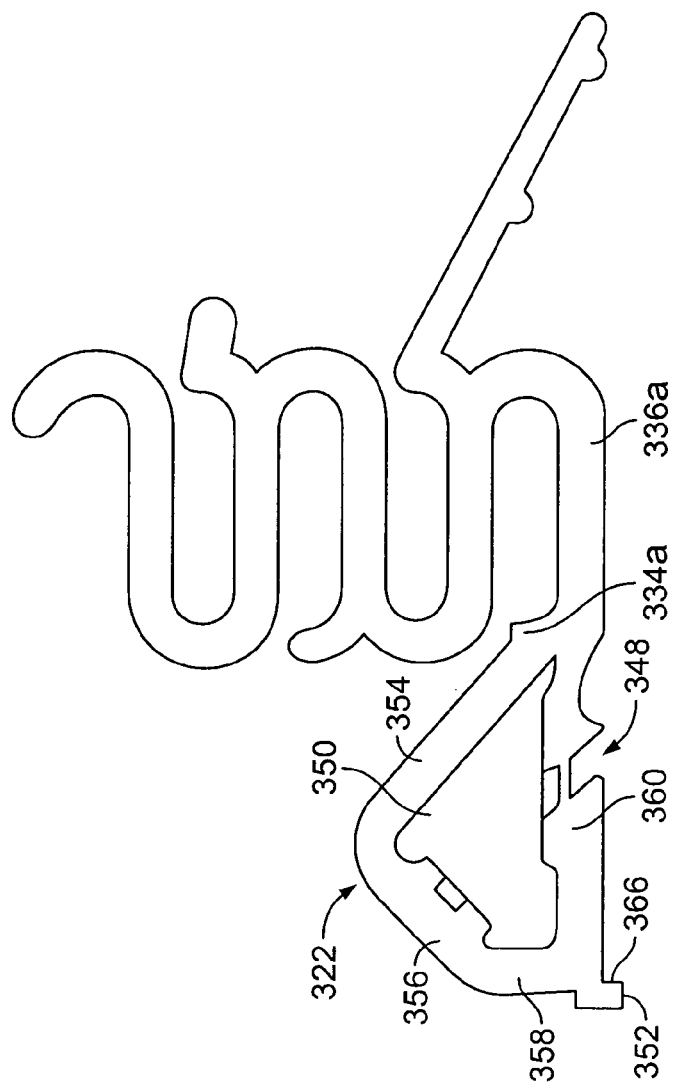
FIG. 14 is a rear elevational view of the device of FIG. 11.
Figure 16:
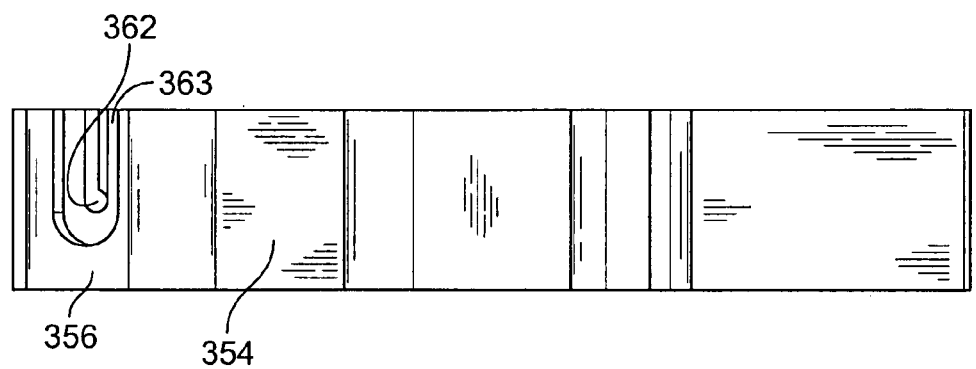
FIG. 16 is a top plan view of the device of FIG. 11.
Figure 17:
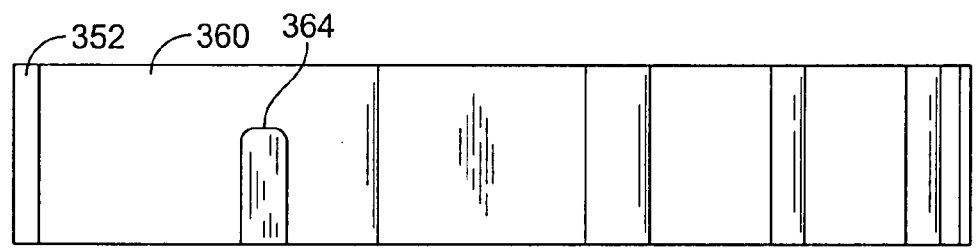
FIG. 17 is a bottom plan view of the device of FIG. 11.

A first embodiment of the device 220 is shown in FIGS. 1-10. A second embodiment of the device 320 is shown in FIGS. 11-17.

Attention is invited to the first embodiment of the device 220 shown in FIGS. 1-10. The device 220 includes a nail attachment portion 222, a wire or cable receiving portion 224 and an alignment portion 226. The device 220 is flexible and is preferably integrally formed of polypropylene or other similar relatively flexible plastic material. The device 220 is preferably formed by molding. The particular material used is not critical other than it provides sufficient flexibility so that the device 220 can function in its intended manner.

The wire or cable receiving portion 224 is formed of a plurality of segments 228a, 228b, 228c, 228d and a top segment 230. The segments 228a, 228b, 228c, 228d and the top segment 230 are generally stacked and form a generally serpentine-shaped spine to provide a plurality of wire or cable receiving slots 232a, 232b, 232c, 232d into which a wire or cable 14 is inserted through entry openings 240a, 240b, 240c, 240d.

Each segment 228a, 228b, 228c, 228d includes a first tail portion 234a, 234b, 234c, 234d which has first and second ends, a main portion 236a, 236b, 236c, 236d which has first and second ends, an end portion 238a, 238b, 238c, 238d which has first and second ends. Portions 236a, 236b, 236c, 236d are shown as straight, but other shapes may be provided; for example, portions 236a, 236b, 236c, 236d may be wavy, may have bumps, dimples or ridges or other projections thereon and the like. Portions 238a, 238b, 238c, 238d are shown as arcuate; however, it is to be understood that other shapes may be provided. For example, instead of being arcuate, portions 238a, 238b, 238c, 238d could be squared off. Segments 228b, 228c, 228d also include a second tail portion 239b, 239c, 239d which has first and second ends.

The second end of the respective first tail portion 234a, 234b, 234c, 234d is connected to the first end of the respective main portion 236a, 236b, 236c, 236d. Each first tail portion 234a, 234b, 234c, 234d has a flat first end and curves upwardly from the respective main portion 236a, 236b, 236c, 236d such that the first end is free. The second end of the respective main portion 236a, 236b, 236c, 236d is connected to the first end of the respective end portion 238a, 238b, 238c, 238d. The second end of the respective end portion 238a, 238b, 238c, 238d is connected to the second end of the first tail portion 234b, 234c, 234d of the next segment 228b, 228c, 228d. In segments 236b, 236c, 236d, the second end of the respective second tail portion 239b, 239c, 239d is connected to the second end of the respective main portion 236b, 236c, 236d, such that the second tail portion 239b, 239c, 239d is provided between the main portion 236b, 236c, 236d and the end portion 238b, 238c, 238d. Each second tail portion 239b, 239c, 239d has a flat first end and curves downwardly from the respective main portion 236b, 236c, 236d such that the first end is free. As many segments as desired can be provided to form the wire or cable receiving portion 224. As shown, four segments are provided, but more than four or fewer than four segments can be provided. The main portions 236a, 236b, 236c, 236d of each segment 228a, 228b, 228c, 228d are parallel to each other and have equal lengths. The end portions 238a, 238b, 238c, 238d have equal lengths and heights to each other. The first tail portion 234a, 234b, 234c of the respective segment 228a, 228b, 228c is adjacent the second tail portion 239b, 239c, 239d of the respective segment 228b, 228c, 228d such that the entry openings 240a, 240b, 240c are provided between the first tail portion 234a, 234b, 234c and the second tail portion 239b, 239c, 239d.

Wire or cable receiving slot 232a is formed by the main portions 236a, 236b and the end portion 238a. Entry opening 240a provides for entry of the wire or cable 14 into the wire or cable receiving slot 232a. Wire or cable receiving slot 232b is formed by the main portions 236b, 236c and the end portion 238b. Entry opening 240b provides for entry of the wire or cable 14 into the wire or cable receiving slot 232b. Wire or cable receiving slot 232c is formed by the main portions 236c, 236d and the end portion 238c. Entry opening 240c provides for entry of the wire or cable 14 into the wire or cable receiving slot 232c. Each entry opening 240a, 240b, 240c has a dimension which is smaller than the smallest dimension of the wire or cable 14 inserted therethrough to aid in the inadvertent detachment of the wire or cable 14 once it is inserted into the wire or cable receiving slot 232a, 232b, 232c. The curve of the first tail portion 234a, 234b, 234c and the curve of the second tail portion 239b, 239c, 239d on opposite sides of the respective entry openings 240a, 240b, 240c provides a guide for the entry of the wire or cable 14 into the wire or cable receiving slot 232a, 232b, 232c.

An extending portion 241 is formed on the second end of the first tail portion 234d of the uppermost segment 228d, such that the first tail portion 234d and the extending portion 241 form a finger grip. The extending portion 241 curves upwardly and outwardly from the main portion 236d of the uppermost segment 228d.

The top segment 230 includes a main portion 242 which has first and second ends, and an arcuate finger actuation portion 244 which has first and second ends. The first end of the main portion 242 is connected to the second end of the end portion 238d of the uppermost segment 228d. The first end of the finger actuation portion 244 is connected to the second end of the main portion 242. The finger actuation portion 244 is arcuate and curves upwardly and outwardly from the main portion 242 such that the second end is free. Bumps or ridges are provided on the finger actuation portion 244 for enabling a user to easily grip same. The extending portion 241 and the finger actuation portion 244 are proximate each other. The purpose of the portions 241, 244 is described in further detail herein.

The main portion 242 of the top segment 230 is parallel to the main portions 236a, 236b, 236c, 236d of the segments 228a, 228b, 228c, 228d and has length equal to the segments 228a, 228b, 228c, 228d. The finger portion 244 is adjacent the extending portion 241 and first tail portion 234d of the uppermost segment 228d such that the entry opening 240d is provided between the first tail portion 234d of the uppermost segment 228d and the finger actuation portion 244 of the top segment 230.

The wire or cable receiving slot 232d between the top segment 230 and the uppermost segment 228d is defined by the main portion 236d of the uppermost segment 228d, the end portion 238d of the uppermost segment 228d and the main portion 242 of the top segment 230. The entry opening 240d provides for entry of the wire or cable 14 into the wire or cable receiving slot 232d. The entry opening 240d has a dimension which is smaller than the smallest dimension of the wire or cable 14 inserted therethrough to aid in preventing the inadvertent detachment of the wire or cable 14 once it is inserted into the wire or cable receiving slot 232d. The curve of the extending portion 241 and the curve of the finger actuation portion 244 on opposite sides of the entry opening 40d provides a guide for the entry of the wire or cable 14 into the wire or cable receiving slot 232d.

The segments 228a, 228b, 228c, 228d and the top segment 230 are relatively thin, preferably approximately 0.175 inches, to allow for flexure of the segments 228a, 228b, 228c, 228d, 230. As a result, the segments 228a, 228b, 228c, 228d, 230 will easily move away from each other. This enables a user to more easily insert a wire or cable 14 through the respective entry openings 240a, 240b, 240c, 240d because the adjacent segment 228a, 228b, 228c, 228d, 230 will move to allow entry of the wire or cable 14 into the wire or cable receiving slot 232a, 232b, 232c, 232d and thereafter return to its original position.

Because of the generally serpentine-shaped spine of the wire or cable receiving portion 224, the user inserts wires or cables 14 on alternating sides of the wire or cable receiving portion 224. This provides an advantage over the prior art design shown in U.S. Pat. No. 5,090,645. In the '645 patent, the extensions may be repeatedly spread apart which places stress on the upright support member. This can cause the support member to bow, thereby spreading the extensions apart from each other and possibly enabling the wires or cables 14 to slip out between the extensions.

In addition, the extending portion 241 and the finger actuation portion 244 can be gripped by a user and pulled away from each other or pushed toward each other. Depending on the amount of force applied during these actions, this will cause the appropriate segments 228a, 228b, 228c, 228d, 230 to separate (thereby spreading openings 240a, 240b, 240c, 240d and enlarging at least a portion of wire or cable receiving slots 232a, 232b, 232c, 232d), so that a user can easily insert or remove a particular wire or cable 14 from between two of the segments. This also provides an advantage over the prior art design shown in U.S. Pat. No. 5,090,645. In the '645 patent, it can be difficult to spread the extensions away from each other because the user has to insert his or her finger between the two uppermost extensions to spread the extension apart. For a user with larger fingers, it can be difficult to grip the extension.

A pair of flexible, spaced apart tabs 270b, 272b; 270c, 272c; 270d, 272d, 270e, 272e extend from the main portions 236b, 236c, 236d, 242 of the segments 228b, 228c, 228d, 230 such that the tabs 270b, 272b; 270c, 272c; 270d, 272d, 270e, 272e overhang the wire or cable receiving slots 232a, 232b, 232c, 232d. Each tab 270b, 272b; 270c, 272c; 270d, 272d, 270e, 272e has a first end and a second end. The first end of each tab 270b, 272b; 270c, 272c; 270d, 272d, 270e, 272e is attached to the respective main portion 236b, 236c, 236d, 242 and the second end is free. Each tab 270b, 272b; 270c, 272c; 270d, 272d, 270e, 272e curves outwardly and downwardly from the respective main portion 236b, 236c, 236d, 242 such that it at least partially overlaps the respective wire or cable receiving slot 232a, 232b, 232c, 232d. The second end of each tab 270b, 272b; 270c, 272c; 270d, 272d, 270e, 272e is spaced from the bottom wall, formed by main portions 236a, 236b, 236c, 236d, of the wire or cable receiving slots 232a, 232b, 232c, 232d. Preferably, the first end of each tab 270b, 272b; 270c, 272c; 270d, 272d, 270e, 272e is between approximately 0.045 inches and approximately 0.075 inches thick and that the second end of each tab 270b, 272b; 270c, 272c; 270d, 272d, 270e, 272e is between approximately 0.035 inches and approximately 0.065 inches thick, so that each tab 270b, 272b; 270c, 272c; 270d, 272d, 270e, 272e is strong and resilient enough to effectively hold onto wires or cable 14, and still be flexible enough so that each tab 270b, 272b; 270c, 272c; 270d, 272d, 270e, 272e can accommodate a wide spectrum of wire or cable 14 sizes and profiles. It is also preferred that there be a gap between the second end of the tabs 270b, 272b; 270c, 272c; 270d, 272d, 270e, 272e and the bottom walls, formed by main portions 236a, 236b, 236c, 236d, of the wire or cable receiving slots 232a, 232b, 232c, 232d of approximately 0.068 inches to approximately 0.09 inches to ensure that the tabs 270b, 272b; 270c, 272c; 270d, 272d, 270e, 272e do not completely obstruct the wire or cable receiving slots 232a, 232b, 232c, 232d, which could make installation of the wires or cables 14 difficult. Finally, it is preferred that the second end of each tab 270b, 272b; 270c, 272c; 270d, 272d, 270e, 272e has radii of approximately 0.1 inches to ensure that the insulation of they wires or cables 14 is not damaged during installation or removal.

When the wire or cable 14 is inserted into the wire or cable receiving slots 232a, 232b, 232c, 232d, the wire or cable 14 is trapped by the tabs 270b, 272b; 270c, 272c; 270d, 272d, 270e, 272e to prevent the movement of the wire or cable 14 from a direction perpendicular to the wire or cable receiving slots 232a, 232b, 232c, 232d.

The nail attachment portion 222 is attached to the first tail portion 234a of the lowermost segment 228a. The nail attachment portion 222 is formed from a generally triangularly-shaped wall 248, a wall 250 which closes one end of the triangularly-shaped wall 248, a stop 252 and a start gauge 267.

The generally triangularly-shaped wall 248 is formed from a first wall 254, a second wall 256, a third wall 258 and a fourth wall 260. The first wall 254 is angled and extends upwardly and outwardly from the first tail portion 234a of the lowermost segment 228a, such that a first end of the first wall 254 is attached to the first tail portion 234a. The second wall 256 extends downwardly from a second end of the first wall 254 and is angled relative thereto, such that a first end of the second wall 256 is connected to the second end of the first wall 254. The third wall 258 extends vertically from the second wall 256, such that a first end of the third wall 258 is attached to a second end of the second wall 256. The fourth wall 260 extends between a second end of the third wall 258 and the first tail portion 234a, such that a first end of the fourth wall 260 is attached to the second end of the third wall 258 and a second end of the fourth wall 260 is attached to the first tail portion 234a. The lower surface of the fourth wall 260 is generally aligned with a lower surface of the main portion 236a of the lowermost segment 228a.

The second wall 256 has an aperture 262 provided therethrough. The fourth wall 260 has an aperture 264 provided therethrough. The apertures 262, 264 provide a nail passageway. A nail 18 can be inserted through the aperture 262 in the second wall 256 and then through the aperture 264 in the fourth wall 260 to attach the nail attachment portion 222 to the wooden stud 16. The passageway formed by the apertures 262, 264 has a centerline that is angled with respect to the mounting surface of any stud 16 to which the device 220 will be nailed. Preferably, the angle between the centerline of the passageway and the normal of the mounting surface of the stud 16 is approximately thirty-five degrees. A nail head recess 263 is provided in the second wall 256 and surrounds the aperture 262 to allow the nail head to be seated therein such that the nail head is flush with the second wall 256 when inserted. A chip clearance groove 265 is provided in the fourth wall 260 and surrounds the aperture 264. If wood chips are raised as the nail 18 penetrates the wood of the stud 16, the wood chips will enter into the chip clearance groove 265.

Ribs 257a, 257b are provided on the sides of the apertures 262, 264 and extend between the second wall 256 and the fourth wall 250. The ribs 257a, 257b are angled relative to the fourth wall 250 and thus are angled relative to the mounting surface to which the device 220 is to be attached.

The stop 252 extends downwardly from the first end of the fourth wall 260 and the second end of the third wall 258. The start gauge 267 is positioned a predetermined distance, preferably approximately 0.038 inches, away from the stop 252 along the fourth wall 260. The start gauge 267 is attached to one side of the fourth wall 260 and hangs down from the fourth wall 260. The purpose of the stop 252 and the start gauge 267 is described in greater detail herein.

On the underside of the fourth wall 260, a notch 266 is provided and is defined by the start gauge 267. The notch 266 is spaced from the stop 252 and from the aperture 264.

The alignment portion 226 is not necessary for the functioning of the device 220, but it is preferred for simplicity in use. The alignment portion 226 is formed by a generally triangular wall 274 which extends from the end portion 238a of the lowermost segment 228a, a wall 276 which closes one end of the triangularly-shaped wall 274 and an elongate portion 278.

The generally triangularly-shaped wall 274 is formed from a first wall 280, a second wall 282 and a third wall 284. The first wall 280 is angled and extends upwardly and outwardly from the lower end of the end portion 238a of the lowermost segment 228a. The second wall 282 extends upwardly from a second end of the first wall 280 and is angled relative thereto, such that a first end of the second wall 282 is connected to the second end of the first wall 280. The third wall 284 extends between a second end of the second wall 282 and the upper end of the end portion 238a of the lowermost segment 228a. The connection between the first and second walls 280, 282 from an apex of the generally triangularly-shaped wall 274. The third wall 284 is generally parallel to the surface of the stud 16 to which the device 220 is to be attached.

The elongate portion 278 extends downwardly from the apex of the generally triangular wall portion 274. A free end of the elongate portion 276 is generally aligned with the lower surface of the main portion 236a of the lowermost segment 228a and the lower surface of the fourth wall 260.

Because the wire or cable receiving slots 232a, 232b, 232c, 232d are formed by the generally serpentine-shaped spine that undulates back and forth, two of the openings 240a, 240c of the wire or cable receiving slots 232a, 232c face the side of the device 220 where the nail aperture 262 is located, while two of the openings 240b, 240d of the wire or cable receiving slots 232b, 232d face away from the side of the device 220 where the nail aperture 262 is located. Wire or cable receiving slot 232a has lead-in surfaces provided by the first wall 254 and the end portion 238b. Wire or cable receiving slot 232b has lead-in surfaces provided by the third wall 284, which forms a shelf, and the end portion 238c. If the alignment portion 226 is not provided, the wire or cable receiving slot 232b has lead-in surfaces provided by the end portions 238a and 238c. Wire or cable receiving slot 232c has lead-in surfaces provided by the end portions 238b and 238d. Wire or cable receiving slot 232d has lead-in surfaces provided by the extending portion 241 and the finger actuation portion 244.

An installer uses the device 220 in the follow manner. To attach the device 220 to a stud 16, the edge of the stud 16 is placed within the notch 266. To effect same, the device 220 is generally placed at approximately a forty-five degree angle relative to the stud 16; the edge of the stud 16 is placed into the notch 266; and the device 220 is then rotated until the lower surfaces of the fourth wall 260 and the main portion 236a of the lowermost segment 228a are seated against the surface of the stud 16. As a result, the start gauge 267 abuts the end of the wooden stud 16. The nail 18 is then placed through the apertures 262, 264 and driven into the stud 16 using a hammer, causing the nail 18 to penetrate the wooden stud 16 until the head of the nail 18 is firmly seated within nail head recess 263. As the nail 18 is driven into the stud 16, some lateral force with respect to the mounting surface of the stud 16 is exerted on the device 220 and the device 220 tends to traverse or "walk" across the stud 16 until the stop 252 hits the end of the stud 16 and the start gauge 267 bends out of the way. The stop 252 will engage the edge of the stud 16 to deter the further "walking" of the device 220 across the stud 16 as the nail 18 is driven. The edge of the stud 16 is generally radiused such that the end gauge 252 will abut the radius and be flush with the stud 16 when the nail 18 is fully seated. Often, chips are raised as the nail 18 penetrates the wood of the stud 16 and the chip enter into the chip clearance groove 265, whose presence prevents any shifting of the device 220 by these chips. At this point the installer can be confident that the device 220 is properly positioned on the stud 16 such that any installed wire or cables 14 will meet the National Electric Code and the Canadian Electric Code. The nail head recess 263 makes it less likely that something could snag onto the nail head accidentally and loosen the nail 18 and shift the position of the device 220 after it has been fully secured. When the user places the device 220 onto the stud 16, the user places his or her finger against the edge of the stud 16 proximate to the free end of the alignment portion 226. As discussed herein, when the nail 18 is driven into the stud 16, the device 220 tends to "walk" across the stud 16. The user will know that the wire or cable receiving portion 224 is not properly positioned on the center of the stud 16 if the free end of the alignment portion 226 extends beyond the edge of the stud 16. Because the user has his or her finger positioned proximate the free end, the user will be able to feel if the free end extends beyond the edge of the stud 16.

It is preferable that the distance between the start gauge 267 and the stop 252 be approximately 0.038 inches to ensure that the nail 18 will be fully seated within the nail head recess 263 about the same time the stop 252 engages the end of the stud 16. Although the same effect could be achieved without a physical start gauge that protrudes below the fourth wall 250 by lining the device 220 up with the end of the stud 16 using a line scribed on the side of the fourth wall 250, this method would be more time consuming and inaccurate than having a gauge that is tactile as well as visual. It is also preferable that the angle between the centerline of the apertures 262, 264 and the normal of the mounting surface of the stud 16 be approximately thirty-five degrees to ensure that the installer can hit the nail head with a hammer without hitting another stud 16 or other obstruction.

The ribs 257a, 257b provide support to the device 220 when the nail head is seated within the nail head recess 263 during the hammering operation. This support becomes critical in cold temperatures to keep the polypropylene part from fracturing during the installation of the device 220. This prevents possible electrical hazards and installer frustration when using the device 220 in winter conditions.

Once the device 220 has been nailed to the wooden stud 16, the installer can push on the finger actuation portion 244, causing the serpentine spine to dynamically alter its shape, causing the openings 240a, 240c for the wire or cable receiving slots 232a, 232c nearest the aperture 262 to open up so that the wires or cables 14 can be inserted into the wire or cable receiving slots 232a, 232c. As the installer pushes the wires or cables 14 into the wire or cable receiving slots 232a, 232c, the wires or cables 14 engage the lead-in surfaces, which in turn, create mechanical advantage to further open up these wire or cable receiving slots 232a, 232c, aiding in the installation of the wires or cables 14. Also, it is preferable if the wall thickness of the generally serpentine-shaped spine is approximately 0.175 inches thick so that the generally serpentine-shaped spine can be both easily manipulated and rigid enough to hold stiff power wires. Typically, the installer will be positioned on the side of the device 220 where the nail 18 is so that the installer can properly see the head of the nail 18 during the installation process. The natural tendency will be of course to use the wire or cable receiving slots 232a, 232c that are facing the nail 18, because the insertion of wires or cables 14 will then be easily seen.

If more wires or cables 14 need to be installed into the device 220 and the wire or cable receiving slots 232a, 232c facing the installer are already full, the installer will typically take the additional wires or cables 14 and slip same over the top of the finger actuation portion 244 and slide the wires or cables 14 down until the wires or cables 14 either bottoms out on either the top of the extending portion 241 or on top of the third wall 284 which forms a shelf, at which point the installer will know that the wire or cable 14 is positioned properly for insertion into one of the wire or cable receiving slots 232b, 232d on the blind side of the device 220. Then the installer simply needs to pull back on the wire or cable 14 as the finger actuation portion 244, which will cause the wire or cable receiving slots 232b, 232d on the blind side of the device 220 to open up. Eventually, the wire or cable 14 will contact one of the lead-in surfaces, which in turn, will provide additional mechanical advantage to open up the wire or cable receiving slots 232b, 232d until the wire or cable 14 can slide therein. The extending portion 241 and the third wall 284 ease the blind installation of wires or cable 14 into the device 220.

Once wires or cables 14 have been installed into the wire or cable receiving slots 232a, 232b, 232c, 232d, the wires or cables 14 are prevented from falling out of the wire or cable receiving slots 232a, 232b, 232c, 232d by the tail portions 234a, 239b; 234b, 240b; 234c, 239d; 234d, 240d, which are located near the openings 240a, 240b, 240c, 240d of the wire or cable receiving slots 232a, 232b, 232c, 232d and form nearly perpendicular angles with respect to the top and bottom surfaces of the wire or cable receiving slots 232a, 232b, 232c, 232d. As a consequence of these steep angles, it requires more force to remove the wires or cables 14 from the wire or cable receiving slots 232a, 232b, 232c, 232d then to insert them. This enhances the overall performance of the device 220.

The wire or cable receiving portion 224 is decoupled from the nail attachment portion 222 in that they are in effect two different components, even if the nail 18 is overdriven into the nail attachment portion 222 and the second wall 256 buckles because of the soft nature of the material. If the nail 18 is overdriven, the nail attachment portion 222 will not pull on the wire or cable 14 receiving portion 224. This provides an advantage over the prior art design shown in U.S. Pat. No. 5,090,645. In the '645 patent, as the nail is driven into the stud, if a user overdrives the nail (i.e., places one too many blows on the nail such that it deforms the brace), the support member is effected. The upright support member is deflected toward the brace which causes the extensions to spread apart from each other and possibly enabling the wires or cables 14 to slip out between the extensions.

The flexible, spaced apart tabs 270b, 272b; 270c, 272c; 270d, 272d, 270e, 272e which extend from the main portions 236b, 236c, 236d, 242 of the segments 228b, 228c, 228d, 230 provide additional advantages. As the installer inserts a wire or cable 14 into any wire or cable receiving slots 232a, 232b, 232c, 232d, the wire or cable 14 will contact and deflect the appropriate tabs 270b, 272b; 270c, 272c; 270d, 272d, 270e, 272e. The tab 270b, 272b; 270c, 272c; 270d, 272d, 270e, 272e then exerts force on the wire or cable 14, preventing the wire or cable 14 from falling out of the wire or cable receiving slot 232a, 232b, 232c, 232d, or sliding in a direction that is generally parallel to the length of the wire or cable 14.

Attention is invited to the second embodiment of the device 320 shown in FIGS. 11-17. The device 320 includes a nail attachment portion 322, a wire or cable receiving portion 324 and an alignment portion 326. The device 320 is flexible and is preferably integrally formed of polypropylene or other similar relatively flexible plastic material. The device 320 is preferably formed by molding. The particular material used is not critical other than it provides sufficient flexibility so that the device 320 can function in its intended manner.

The wire or cable receiving portion 324 is formed of a plurality of segments 328a, 328b, 328c, 328d and a top segment 330. The segments 328a, 328b, 328c, 328d and the top segment 330 are generally stacked and form a generally serpentine-shaped spine to provide a plurality of wire or cable receiving slots 332a, 332b, 332c, 332d into which a wire or cable is inserted through entry openings 340a, 340b, 340c, 340d.

Each segment 328a, 328b, 328c, 328d includes a tail portion 334a, 334b, 334c, 334d which has first and second ends, a main portion 336a, 336b, 336c, 336d which has first and second ends, and an end portion 338a, 338b, 338c, 338d which has first and second ends. Portions 336a, 336b, 336c, 336d are shown as straight, but other shapes may be provided; for example, portions 336a, 336b, 336c, 336d may be wavy, may have bumps, dimples or ridges or other projections thereon and the like. Portions 338a, 338b, 338c, 338d are shown as arcuate; however, it is to be understood that other shapes may be provided. For example, instead of being arcuate, portions 338a, 338b, 338c, 338d could be squared off. The second end of the respective tail portion 334a, 334b, 334c, 334d is connected to the first end of the respective main portion 336a, 336b, 336c, 336d. Each tail portion 334a, 334b, 334c, 334d is arcuate and curves upwardly and outwardly from the respective main portion 336a, 336b, 336c, 336d such that the first end is free. The first end of each tail portion 334a, 334b, 334c, 334d is rounded. The first ends of tail portions 334b, 334c, 334d form a generally hemispherical shape. The second end of the respective main portion 336a, 336b, 336c, 336d is connected to the first end of the respective end portion 338a, 338b, 338c, 338d. The second end of the respective end portion 338a, 338b, 338c, 338d is connected to the second end of the tail portion 334b, 334c, 334d of the next segment 328b, 328c, 328d. As many segments as desired can be provided to form the wire or cable receiving portion 324. As shown, four segments are provided, but more than four or fewer than four segments can be provided. The main portions 336a, 336b, 336c, 336d of each segment 328a, 328b, 328c, 328d are parallel to each other and have equal lengths. The end portions 338a, 338b, 338c, 338d have equal lengths and heights to each other. The tail portion 334a, 334b, 334c of the respective segment 328a, 328b, 328c is adjacent a lower edge of the respective end portion 338b, 338c, 338d such that the entry openings 340a, 340b, 340c are provided between the tail portion 334a, 334b, 334c and the end portion 338b, 338c, 338d.

Wire or cable receiving slot 332a is formed by the main portions 336a, 336b and the end portion 338a. Entry opening 340a provides for entry of the wire or cable into the wire or cable receiving slot 332a. Wire or cable receiving slot 332b is formed by the main portions 336b, 336c and the end portion 338b. Entry opening 340b provides for entry of the wire or cable into the wire or cable receiving slot 332b. Wire or cable receiving slot 332c is formed by the main portions 336c, 336d and the end portion 338c. Entry opening 340c provides for entry of the wire or cable into the wire or cable receiving slot 332c. Each entry opening 340a, 340b, 340c has a dimension which is smaller than the smallest dimension of the wire or cable inserted therethrough to prevent the inadvertent detachment of the wire or cable once it is inserted into the wire or cable receiving slot 332a, 332b, 332c. The rounding of the tail portion 334a, 334b, 334c and the curve of the adjacent end portion 338b, 338c, 338d on opposite sides of the respective entry openings 340a, 340b, 340c provides a guide for the entry of the wire or cable into the wire or cable receiving slot 332a, 332b, 332c.

An extending portion 341 is connected to the second end of the tail portion 334d of the uppermost segment 328d, such that the first tail portion 334d and the extending portion 341 form a finger grip. The extending portion 341 curves upwardly and outwardly from the main portion 336d of the uppermost segment 328d.

The top segment 330 includes a main portion 342 which has first and second ends, and a finger actuation portion 344 which has first and second ends. The first end of the main portion 342 is connected to the second end of the end portion 338d of the uppermost segment 328d. The first end of the finger actuation portion 344 is connected to the second end of the main portion 342. The finger actuation portion 344 is arcuate and curves upwardly and outwardly from the main portion 342 such that the second end is free. Bumps or ridges (not shown) may be provided on the finger actuation portion 344. The extending portion 341 and the finger actuation portion 344 are proximate each other. The purpose of the extending portion 341 and the finger actuation portion 344 is described in further detail herein.

The main portion 342 of the top segment 330 is parallel to the main portions 336a, 336b, 336c, 336d of the segments 328a, 328b, 328c, 328d and has length equal to the segments 328a, 328b, 328c, 328d. The finger portion 344 is adjacent the extending portion 341 and the tail portion 334d of the uppermost segment 328d such that the entry opening 340d is provided between the tail portion 334d of the uppermost segment 328d and the finger actuation portion 344 of the top segment 330.

The wire or cable receiving slot 332d between the top segment 330 and the uppermost segment 328d is defined by the main portion 336d of the uppermost segment 328d, the end portion 338d of the uppermost segment 328d and the main portion 342 of the top segment 330. The entry opening 340d provides for entry of the wire or cable into the wire or cable receiving slot 332d. The entry opening 340d has a dimension which is smaller than the smallest dimension of the wire or cable inserted therethrough to prevent the inadvertent detachment of the wire or cable once it is inserted into the wire or cable receiving slot 332d. The curve of the extending portion 341, the rounding of the tail portion 334d and the curve of the finger actuation portion 344 on opposite sides of the entry opening 340d provides a guide for the entry of the wire or cable into the wire or cable receiving slot 332d.

The segments 328a, 328b, 328c, 328d and the top segment 330 are relatively thin, preferably approximately 0.175 inches, to allow for flexure of the segments 328a, 328b, 328c, 328d, 330. As a result, the segments 328a, 328b, 328c, 328d, 330 will easily move away from each other. This enables a user to more easily insert a wire or cable through the respective entry openings 340a, 340b, 340c, 340d because the adjacent segment 328a, 328b, 328c, 328d, 330 will move to allow entry of the wire or cable into the wire or cable receiving slot 32a, 32b, 32c, 32d and thereafter return to its original position.

Because of the generally serpentine-shaped spine of the wire or cable receiving portion 324, the user inserts wires or cables on alternating sides of the wire or cable receiving portion 324. This provides an advantage over the prior art design shown in U.S. Pat. No. 5,090,645. In the '645 patent, the extensions may be repeatedly spread apart which places stress on the upright support member. This can cause the support member to bow, thereby spreading the extensions apart from each other and possibly enabling the wires or cables to slip out between the extensions.

In addition, the extending portion 341 and the finger actuation portion 344 can be gripped by a user and pulled away from or pushed toward each other. Depending on the amount of force applied, this will cause the appropriate segments 328a, 328b, 328c, 328d, 330 to separate (thereby spreading openings 340a, 340b, 340c, 340d and enlarging at least a portion of wire or cable receiving slots 332a, 332b, 332c, 332d), so that a user can easily insert or remove a particular wire or cable from between two of the segments. This also provides an advantage over the prior art design shown in U.S. Pat. No. 5,090,645. In the '645 patent, it can be difficult to spread the extensions away from each other because the user has to insert his or her finger between the two uppermost extensions to spread the extension apart. For a user with larger fingers, it can be difficult to grip the extension.

The nail attachment portion 322 is attached to the tail portion 334a of the lowermost segment 328a. The nail attachment portion 322 is formed from a generally triangularly-shaped wall 348, a wall 350 which closes one end of the triangularly-shaped wall 348 and a stop 352.

The generally triangularly-shaped wall 348 is formed from a first wall 354, a second wall 356, a third wall 358 and a fourth wall 360. The first wall 354 is angled and extends upwardly and outwardly from the tail portion 334a of the lowermost segment 328a, such that a first end of the first wall 354 is attached to the tail portion 334a. The second wall 356 extends downwardly from a second end of the first wall 354 and is angled relative thereto, such that a first end of the second wall 356 is connected to the second end of the first wall 354. The third wall 358 extends vertically from the second wall 356, such that a first end of the third wall 358 is attached to a second end of the second wall 356. The fourth wall 360 extends between a second end of the third wall 358 and the tail portion 334a, such that a first end of the fourth wall 360 is attached to the second end of the third wall 358 and a second end of the fourth wall 360 is attached to the tail portion 334a. The lower surface of the fourth wall 360 is generally aligned with a lower surface of the main portion 336a of the lowermost segment 328a. Ribs (not shown), like those provided in the first embodiment can be provided in this embodiment.

The second wall 356 has an aperture 362 provided therethrough. The fourth wall 360 has an aperture 364 provided therethrough. The apertures 362, 364 provide a nail passageway. A nail (not shown) can be inserted through the aperture 362 in the second wall 356 and then through the aperture 364 in the fourth wall 360 to attach the nail attachment portion 322 to the wood stud. The passageway formed by the apertures 362, 364 has a centerline that is angled with respect to the mounting surface of any stud to which the device 320 will be nailed. Preferably, the angle between the centerline of the passageway and the normal of the mounting surface of the stud is approximately thirty-five degrees. A nail head recess 363 is provided in the second wall 356 and surrounds the aperture 362 to allow the nail head to be seated therein such that the nail head is flush with the second wall 356 when inserted. A chip clearance groove 365 is provided in the fourth wall 360 and surrounds the aperture 364. If wood chips are raised as the nail penetrates the wood of the stud, the wood chips will enter into the chip clearance groove 365.

The stop 352 extends downwardly from the first end of the fourth wall 360 and the second end of the third wall 358. The purpose of the stop 352 is described in greater detail herein. On the underside of the fourth wall 360, a notch 366 is provided and is defined by the stop 352. The purpose of the notch 366 is described in greater detail herein.

The wire or cable receiving portion 324 is decoupled from the nail attachment portion 322 in that they are in effect two different components, even if the nail is overdriven into the nail attachment portion 322 and the second wall 356 buckles because of the soft nature of the material. If the nail is overdriven, the nail attachment portion 322 will not pull on the wire or cable receiving portion 324. This provides an advantage over the prior art design shown in U.S. Pat. No. 5,090,645. In the '645 patent, as the nail is driven into the stud, if a user overdrives the nail (i.e., places one too many blows on the nail such that it deforms the brace), the support member is effected. The upright support member is deflected toward the brace which causes the extensions to spread apart from each other and possibly enabling the wires or cables to slip out between the extensions.

The alignment portion 326 is not necessary for the functioning of the device 320, but it is preferred for simplicity in use. The alignment portion 326 is formed by an elongate portion 378 which extends downwardly from an upper extent of the end portion 338a of the lowermost segment 328a. A free end of the elongate portion 378 is generally aligned with the lower surface of the main portion 336a of the lowermost segment 328a and the lower surface of the fourth wall 360.

Because the wire or cable receiving slots 332a, 332b, 332c, 332d are formed by the generally serpentine-shaped spine that undulates back and forth, two of the openings 340a, 340c of the wire or cable receiving slots 332a, 332c face the side of the device 320 where the nail aperture 362 is located, while two of the openings 340b, 340d of the wire or cable receiving slots 332b, 332d face away from the side of the device 320 where the nail aperture 362 is located. Wire or cable receiving slot 332a has lead-in surfaces provided by the first wall 354 and the end portion 338b. Wire or cable receiving slot 332b has lead-in surfaces provided by the elongate portion 378 and the end portion 338c. If the alignment portion 326 is not provided, the wire or cable receiving slot 332b has lead-in surfaces provided by the end portions 338a and 338c. Wire or cable receiving slot 332c has lead-in surfaces provided by the tail portion 334c and end portion 338d. Wire or cable receiving slot 332d has lead-in surfaces provided by the extending portion 341 and the finger actuation portion 344.

An installer uses the device 320 in the follow manner. To attach the device 320 to a stud, the edge of the stud is placed within the notch 366. To effect same, the device 320 is generally placed at approximately a forty-five degree angle relative to the stud; the edge of the stud is placed into the notch 366; and the device 320 is then rotated until the lower surfaces of the fourth wall 360 and the main portion 336a of the lowermost segment 328a are seated against the surface of the stud. The nail is then placed through the apertures 362, 364 and driven into the stud using a hammer, causing the nail to penetrate the wooden stud until the head of the nail is firmly seated within nail head recess 363. As the nail is driven into the stud, some lateral force with respect to the mounting surface of the stud is exerted on the device 320 and the device 320 tends to traverse or "walk" across the stud until the stop 352 hits the end of the stud. The stop 352 will engage the edge of the stud to deter the further "walking" of the device 320 across the stud as the nail is driven. The edge of the stud is generally radiused such that the stop 352 will abut the radius and be flush with the stud when the nail is fully seated. Often, chips are raised as the nail penetrates the wood of the stud and the chip enter into the chip clearance groove 365, whose presence prevents any shifting of the device 320 by these chips. At this point the installer can be confident that the device 320 is properly positioned on the stud such that any installed wires will meet the National Electric Code and the Canadian Electric Code. The nail head recess 363 makes it less likely that something could snag onto the nail head accidentally and loosen the nail and shift the position of the device 320 after it has been fully secured. When the installer places the device 320 onto the stud, the user places his or her finger against the edge of the stud proximate to the free end of the alignment portion 326. As discussed herein, when the nail is driven into the stud, the device 320 tends to "walk" across the stud. The user will know that the wire or cable receiving portion 324 is not properly positioned on the center of the stud if the free end of the alignment portion 326 extends beyond the edge of the stud. Because the installer has his or her finger positioned proximate the free end, the installer will be able to feel if the free end extends beyond the edge of the stud. It is also preferable that the angle between the centerline of the apertures 362, 364 and the normal of the mounting surface of the stud be approximately thirty-five degrees to ensure that the installer can hit the nail head with a hammer without hitting another stud or other obstruction.

A start gauge, like that shown and described in the first embodiment, can be provided in this second embodiment. Tabs, like that shown and described in the first embodiment, can be provided in this second embodiment.

Once the device 320 has been nailed to the wooden stud, the installer can push on the finger actuation portion 344, causing the serpentine spine to dynamically alter its shape, causing the openings 340a, 340c for the wire or cable receiving slots 332a, 332c nearest the aperture 362 to open up so that the wires or cables can be inserted into the wire or cable receiving slots 332a, 332c. As the installer pushes the wires or cables into the wire or cable receiving slots 332a, 332c, the wires engage the lead-in surfaces, which in turn, create mechanical advantage to further open up these wire or cable receiving slots 332a, 332c, aiding in the installation of the wires or cables. Also, it is preferable if the wall thickness of the generally serpentine-shaped spine is approximately 0.175 inches thick so that the generally serpentine-shaped spine can be both easily manipulated and rigid enough to hold stiff power wires. Typically, the installer will be positioned on the side of the device 320 where the nail is so that the installer can properly see the head of the nail during the installation process. The natural tendency will be of course to use the wire or cable receiving slots 332a, 332c that are facing the nail, because the insertion of wires or cables will then be easily seen.

If more wires or cables need to be installed into the device 320 and the wire or cable receiving slots 332a, 332c facing the installer are already full, the installer will typically take the additional wires or cables and slip same over the top of the finger actuation portion 344 and slide the wires or cables down until the wires or cables either bottoms out on either the top of the extending portion 341 or on top of the elongate portion 378, at which point the installer will know that the wire or cable is positioned properly for insertion into one of the wire or cable receiving slots 332b, 332d on the blind side of the device 320. Then the installer simply needs to pull back on the wire or cable as the finger actuation portion 344, which will cause the wire or cable receiving slots 332b, 332d on the blind side of the device 320 to open up. Eventually, the wire or cable will contact one of the lead-in surfaces, which in turn, will provide additional mechanical advantage to open up the wire or cable receiving slots 332b, 332d until the wire or cable can slide therein. The extending portion 341 and elongate portion 278 ease the blind installation of wires or cable into the device 320.

Once wires or cables have been installed into the wire or cable receiving slots 332a, 332b, 332c, 332d, the wires or cables are prevented from falling out of the wire or cable receiving slots 332a, 332b, 332c, 332d by the tail portions 334a, 334b, 334c, 334d, which are located near the openings 340a, 340b, 340c, 340d of the wire or cable receiving slots 332a, 332b, 332c, 332d and form nearly perpendicular angles with respect to the top and bottom surfaces of the wire or cable receiving slots 332a, 332b, 332c, 332d. As a consequence of these steep angles, it requires more force to remove the wires or cables from the wire or cable receiving slots 332a, 332b, 332c, 332d then to insert them. This enhances the overall performance of the device 320.

While preferred embodiments of the present invention are shown and described, it is envisioned that those skilled in the art may devise various modifications of the present invention without departing from the spirit and scope of the appended claims.

The invention claimed is:

1. A device for stacking wires or cables comprising:
   an attachment portion capable of attachment to a stud or other anchor; and
   a wire or cable receiving portion connected to said attachment portion, said wire or cable receiving portion having a plurality of segments which form a generally serpentine shape, thereby providing a plurality of slots, each said slot capable of receiving at least one wire or cable therein, each said segment including
   a main portion having first and second opposite ends and an end portion, wherein in each segment, said main portion has said first end attached to an end of said end portion and said second end attached to an end of the end portion of the next segment,
   a tail portion attached to said second end of said main portion, said tail portion extending into an entry opening of the slot in said segment to deter the release of a wire or cable once the wire or cable is mounted in the slot,
   predetermined ones of said segments further including a second tail portion attached to said second end of said main portion, said second tail portion extending into said entry opening of the slot in the adjacent segment to further deter the release of a wire or cable once the wire or cable is mounted in the slot.

2. A device as claimed in claim 1, further including a top segment which is attached to an uppermost one of said segments, said top segment includes a main portion attached to the end portion of the uppermost one of said segments and a finger actuation portion attached to said main portion.

3. A device as claimed in claim 2, wherein each end portion is arcuate.

4. A device as claimed in claim 3, wherein each main portion is straight.

5. A device as claimed in claim 2, wherein said finger actuation portion is arcuate.

6. A device as claimed in claim 2, further including an extending portion provided on the first end of the segment which is adjacent to the top segment, such that said finger actuation portion and said extending portion are adjacent to each other.

7. A device as claimed in claim 6, wherein said finger actuation portion and said extending portion provide a lead-in to said top segment.

8. A device as claimed in claim 1, wherein each said tail portion is curved to promote the entry of a wire or cable into the slot proximate thereto.

9. A device as claimed in claim 1, wherein each said tail portion is generally perpendicular to the slot in said segment.

10. A device as claimed in claim 1, wherein in adjacent segments, said first-defined tail portion and said second tail portion are adjacent each other to restrict the size of the respective entry opening.

11. A device as claimed in claim 10, wherein each said tail portion is curved to promote the entry of a wire or cable into the slot proximate thereto.

12. A device as claimed in claim 1, wherein each said tail portion is generally perpendicular to the slot in said segment.

13. A device as claimed in claim 1, wherein said end portions provide lead-ins to predetermined ones of said slots.

14. A device for stacking wires or cables comprising:
an attachment portion capable of attachment to a stud or other anchor; and
a wire or cable receiving portion connected to said attachment portion, said wire or cable receiving portion having a plurality of segments which form a generally serpentine shape, thereby providing a plurality of slots, each said slot capable of receiving at least one wire or cable therein, each said segment including a main portion having first and second opposite ends and an end portion, wherein in each segment, said main portion has said first end attached to an end of said end portion and said second end attached to an end of the end portion of the next segment, and a pair of spaced apart tabs extending from each said main portion, each said tab having a first end attached to the respective main portion and a second end which is free.

15. A device as claimed in claim 14, wherein each said tab curves outwardly and downwardly from the respective main portion.

16. A device as claimed in claim 1, wherein said attachment portion is decoupled from said wire or cable receiving portion.

17. A device as claimed in claim 1, further including an alignment portion attached to said wire or cable receiving portion.

18. A device as claimed in claim 17, wherein said alignment portion has a wall which is generally parallel to said slots, said wall providing a lead-in for one of said slots.

19. A device as claimed in claim 18, further including an extending portion provided on the first end of the segment which is adjacent to the top segment, said extending portion provide a lead-in to said top segment.

20. A device as claimed in claim 1, wherein said attachment portion has at least one rib for providing support during the attachment of a nail to said attachment portion.

21. A device as claimed in claim 1, wherein said attachment portion includes a nail passageway provided therein through which a nail is inserted and a pair of ribs for providing support during the attachment of a nail to said attachment portion, said ribs being provided on each side of said nail passageway.

22. A device as claimed in claim 21, wherein a centerline of said nail passageway is angled relative to a bottom of said attachment portion, said angle being approximately thirty-five degrees.

23. A device as claimed in claim 1, wherein said attachment portion includes a nail passageway provided therein through which a nail is inserted, and a nail head recess is provided therein and surrounding one end of said passageway.

24. A device as claimed in claim 1, wherein said attachment portion includes a nail passageway provided therein through which a nail is inserted, and a chip clearance groove provided therein and surrounding one end of said passageway.

25. A device as claimed in claim 1, further including a start gauge provided on said attachment portion.

26. A device as claimed in claim 25, further including a stop provided on said attachment portion, said stop being positioned a predetermined distance away from said start gauge.

27. A device for stacking wires or cables comprising:
an attachment portion capable of attachment to a stud or other anchor;
a wire or cable receiving portion connected to said attachment portion, said wire or cable receiving portion having a slot capable of receiving at least one wire or cable therein; and
a flexible tab having an end attached to said wire or cable receiving portion, said flexible tab extending outwardly from said wire or cable receiving portion and downwardly therefrom in an unflexed condition, said flexible tab terminating in a free end, said free end having an outermost extent that is a predetermined distance away from said wire or cable receiving portion in a direction that is substantially perpendicular to said wire or cable receiving portion, said flexible tab at least partially overlapping said slot, said flexible tab deforming and moving to a flexed condition relative to said wire or cable receiving portion when a wire or cable is trapped, said tab in said flexed condition thereby preventing movement of the wire or cable in a direction perpendicular to said wire or cable receiving portion, wherein said outermost extent of said free end of said flexible tab in said flexed condition contacts the wire or cable.

28. A device as defined in claim 27, wherein two of said tabs are provided.

29. A device as defined in claim 27, wherein said end of said tab attached to said wire or cable receiving portion is between approximately 0.045 inches and approximately 0.075 inches thick, and said free end is between approximately 0.035 inches and approximately 0.065 inches thick.

30. A device as defined in claim 27, wherein in an unflexed position said free end is spaced from said wire or cable receiving portion by approximately 0.068 inches to approximately 0.09 inches.

31. A device as defined in claim 27, wherein said free end has a rounded end.

32. A device as defined in claim 27, wherein said wire or cable receiving portion is generally serpentine-shaped.

33. A device for stacking wires or cables, said device being attached to a stud or other anchor, said stud or other anchor having first and second opposite ends and an outer surface between said ends, said device comprising:
an attachment portion capable of attachment to the stud or other anchor, the attachment portion being mounted on the outer surface of the stud or other anchor;
a start gauge provided on said attachment portion, wherein in use said start gauge is generally aligned with the first end of the stud or other anchor prior to attachment of the device to the stud or other anchor, but during attachment of the device to the stud or other anchor the attachment portion and start gauge move along the outer surface of the stud or other anchor, such that the start gauge is moved out of alignment with the first end;
a stop provided on said attachment portion, said stop being positioned a predetermined distance away from said start gauge; and
a wire or cable receiving portion connected to said attachment portion, said wire or cable receiving portion having a slot capable of receiving at least one wire or cable therein.

34. A device as claimed in claim 33, wherein said start gauge extends downwardly from said attachment portion, said start gauge being bent during attachment of the device to the stud or other anchor.

35. A device for stacking wires or cables comprising:
an attachment portion capable of attachment to a stud or other anchor;
a start gauge provided on said attachment portion, wherein in use said start gauge is generally aligned with an edge of the stud or other anchor prior to attachment of the device to the stud or other anchor, but during attachment of the device to the stud or other anchor the start gauge is moved out of alignment with the edge;
a wire or cable receiving portion connected to said attachment portion, said wire or cable receiving portion having a slot capable of receiving at least one wire or cable therein; and
a stop provided on said attachment portion, said stop being positioned a predetermined distance away from said start gauge, said stop extends downwardly from said attachment portion and is capable of abutting the edge of the stud or other anchor during use.

36. A device for stacking wires or cables comprising:
an attachment portion capable of attachment to a stud or other anchor;
a start gauge provided on said attachment portion, wherein in use said start gauge is generally aligned with an edge of the stud or other anchor prior to attachment of the device to the stud or other anchor, but during attachment of the device to the stud or other anchor the start gauge is moved out of alignment with the edge;
a wire or cable receiving portion connected to said attachment portion, said wire or cable receiving portion having a slot capable of receiving at least one wire or cable therein; and
said start gauge extends downwardly from said attachment portion, said start gauge being bent during attachment of the device to the stud or other anchor; and
a stop provided on said attachment portion, said stop being positioned a predetermined distance away from said start gauge, said stop extends downwardly from said attachment portion and is capable of abutting the edge of the stud or other anchor during use.

* * * * *